United States Patent

[11] 3,603,669

[72] Inventors Kow-Fat Lai;
   Christian Lietar, both of Yverdon Vaud, Switzerland
[21] Appl. No. 857,814
[22] Filed Sept. 15, 1969
[45] Patented Sept. 7, 1971
[73] Assignee Paillard S.A.
   Vaud, Switzerland
[32] Priority Oct. 10, 1968
[33] Switzerland
[31] 15136/68

[54] VARIABLE FOCUS OBJECTIVE
   6 Claims, 6 Drawing Figs.
[52] U.S. Cl. .................................................. 350/186, 350/220
[51] Int. Cl. ................................................... G02b 15/16, G02b 9/34
[50] Field of Search .......................................... 350/184, 186, 220

[56] References Cited
   UNITED STATES PATENTS
3,152,211 10/1964 Cox et al ..................... 350/184

*Primary Examiner*—David Schonberg
*Assistant Examiner*—Paul A. Sacher
*Attorneys*—Emory L. Groff and Emory L. Groff, Jr.

ABSTRACT: A variable-focus objective comprises in order starting from the front, a first divergent fixed-focusing group, two movable groups, one convergent and the other divergent, said two movable groups filling the role of variator and compensator at the same time, and a fixed convergent rear group, said first group comprising at least three lenses of which the first is a convergent lens, the others being divergent, and of the following limiting ratios for the radii of curvature:

$$1.5|f_1| \le R_1 \le 6|f_1|$$
$$0 \le \left|\frac{1}{R_3} - \frac{1}{R_2}\right| \le \left|\frac{1}{f_1}\right|$$
$$0.5|R_6| \le |R_5| \le 4|R_6|$$

where $f_1$ is the focal distance of the focusing group. The first fixed group may include 3 or 4 lenses of which one is convergent and the others divergent. The focusing distance is $2f_1$ to $3f_1$ and the zoom ratio is about 5.

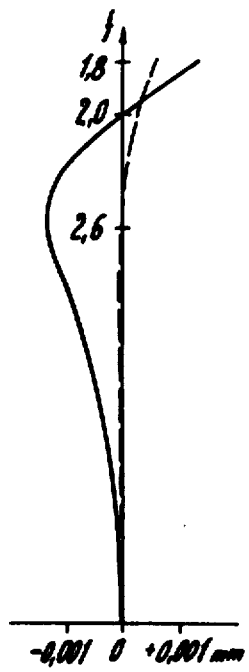
FIG. 3
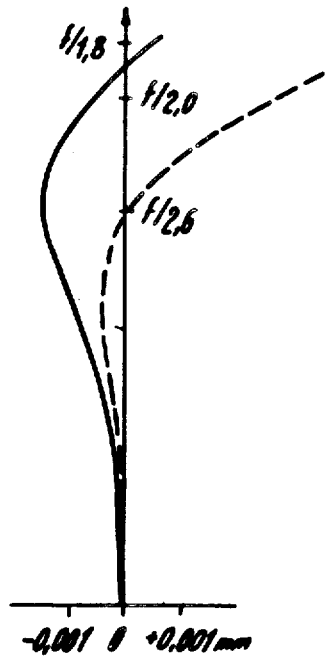
FIG. 4
FIG. 5
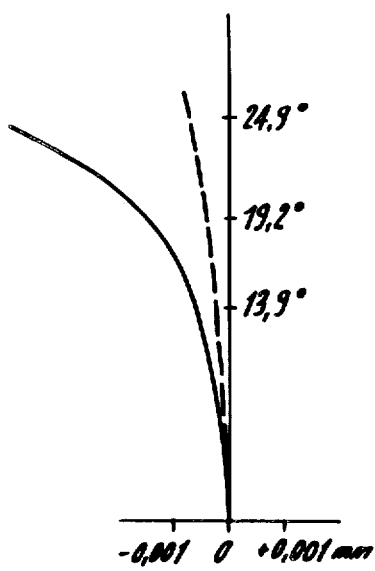
FIG. 6
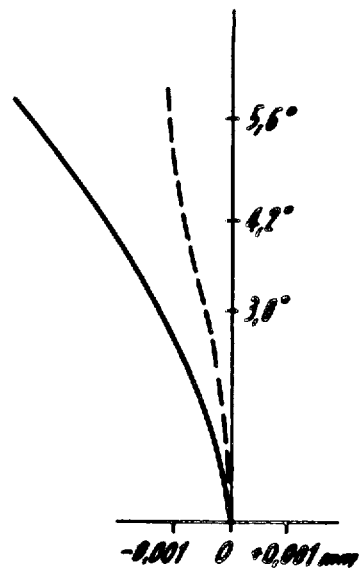

VARIABLE FOCUS OBJECTIVE

The present invention relates to a variable-focus objective comprising, in order starting from the front, a first divergent fixed-focussing group, two movable groups, one convergent the other divergent, these two movable groups filling the functions of variator and compensator at the same time, and a convergent fixed rear group.

In objectives of this type, the shortest distance of focusing, reckoned between the object and the front lens, is in general rather large, of the order of 16 to 20 $f_1$, $f_1$ being the absolute value of the focal distance of the focusing group.

It is an object of the invention to enable the achievement of much shorter focusing distances, of the order of 2 $f_1$ to 3 $f_1$ without this spoiling the quality of the objective which can be very well corrected.

According to the invention, there is provided a variable-focus objective comprising, in order starting from the front, a first divergent fixed-focusing group, two movable groups, one convergent and the other divergent, these two movable groups filling the functions of variator and compensator at the same time, and a convergent fixed rear group. This objective is characterized in that the first group comprises at least three lenses of which the first is a convergent lens, the others being divergent, and by the following limiting ratios for the radii of curvature:

$$1.5|f_1| \leq R_1 \leq 6|f_1|$$

$$0 \leq \left|\frac{1}{R_3} - \frac{1}{R_2}\right| \leq \left|\frac{1}{f_1}\right|$$

$$0.5|R_6| \leq |R_5| \leq 4|R_6|$$

where $f_1$ is the focal distance of the focusing group.

In order that the invention may be more fully understood one embodiment and one variation of the objective according to the invention, are described below, purely by way of illustrative but nonlimiting examples, with reference to the accompanying schematic drawing in which:

FIGS. 3 to 6 illustrate the corrections of the aberrations of the objective shown in FIG. 1.

Figure 1:
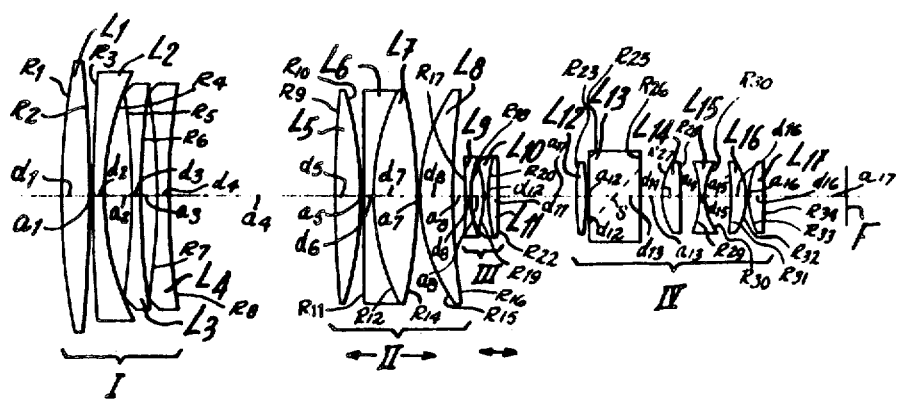
FIG. 1 is a schematic section of the said embodiment.

With reference to FIG. 1, the objective comprises a first group I of four lenses $L_1$ to $L_4$ of which the axial position may be modified to ensure focusing adjustment. The total power of this group is negative, so that this group constitutes a divergent system.

The objective also comprises three other groups, of which two groups II and III are movable to ensure focal variation and stability of focal length whilst group IV is fixed.

Group II includes four lenses $L_5$ to $L_8$ and constitutes a convergent system, whilst group III comprises three lenses $L_9$ to $L_{11}$ and constitutes a divergent system.

Group IV includes six lenses $L_{12}$ to $L_{17}$ and constitutes a convergent system. The second lens $L_{13}$ of this group is an optical flat, this flat comprising a semireflecting surface S intended to send back a portion of the light beam towards a viewing device which is not shown in the drawing. However, this flat has been considered in the following as being a lens of which the two faces have an infinite radius of curvature.

According to one embodiment, the objective shown can have the characteristics indicated in the following table. In this table, the radii of curvature are numbered starting from the first surface of the front lens, but they have not been indicated in the drawing in order not to overcrowd the latter. These radii are positive when the center of curvature occurs on the side of the focal plane F with respect to the apex of the surface under consideration, and negative when the center of curvature is on the object side. The value of the radii is indicated by a multiplication factor of the absolute value of the focal distance $f_1$ from the focusing group I. This is the same for the lens thicknesses designated by $d$ and for the spaces between the lenses designated by $a$. The refractive index of the glass of each lens is indicated under $n$, whilst the constringence, or Abbe number, is indicated under $\nu$.

| L | R | d | n | $\nu$ |
|---|---|---|---|---|
| $L_1$ | $R_1$=3.510 | $d_1$=0.1000 | 1.80518 | 25.43 |
|  | $R_2$=−3.510 | $a_1$=0.0040 |  |  |
| $L_2$ | $R_3$=4.748 | $d_2$=0.0060 | 1.62041 | 60.33 |
|  | $R_4$=1.141 | $a_2$=0.0360 |  |  |
| $L_3$ | $R_5$=−2.599 | $d_3$=0.0360 | 1.62041 | 60.33 |
|  | $R_6$=2.009 | $a_3$=0.0640 |  |  |
|  | $R_7$=−2.247 | $d_4$=0.0360 | 1.62041 | 60.33 |
| $L_4$ | $R_8$=2.245 | $a_4$=0.5972+0.1020 |  |  |
|  | $R_9$=5.002 | $d_5$=0.1040 | 1.62041 | 60.33 |
| $L_5$ | $R_{10}$=−1.281 | $a_5$=0.0040 |  |  |
|  | $R_{11}$=14.854 | $d_6$=0.0360 | 1.80518 | 25.43 |
| $L_6$ | $R_{12}$=0.8686 | $a_6$=0.0000 |  |  |
|  | $R_{13}$=0.8686 | $d_7$=0.1439 | 1.62041 | 60.33 |
| $L_7$ | $R_{14}$=−1.620 | $a_7$=0.0040 |  |  |
|  | $R_{15}$=0.6693 | $d_8$=0.1159 | 1.62041 | 60.33 |
| $L_8$ | $R_{16}$=2.631 | $a_8$=0.0302+0.7781 |  |  |
|  | $R_{17}$=−2.135 | $d_9$=0.0260 | 1.62041 | 60.33 |
| $L_9$ | $R_{18}$=0.4178 | $a_9$=0.340 |  |  |
|  | $R_{19}$=−0.3654 | $d_{10}$=0.0200 | 1.62041 | 60.33 |
| $L_{10}$ | $R_{20}$=0.5230 | $a_{10}$=0.0000 |  |  |
|  | $R_{21}$=0.5230 | $d_{11}$=0.0340 | 1.80518 | 25.43 |
| $L_{11}$ | $R_{22}$=−16.90 | $a_{11}$=0.2581+0.0054 |  |  |
|  | $R_{23}$=1.000 | $d_{12}$=0.340 | 1.62041 | 60.33 |
| $L_{12}$ | $R_{24}$=−1.000 | $a_{12}$=0.0100 |  |  |
|  | $R_{25}$=∞ | $d_{13}$=0.1799 | 1.62041 | 60.33 |
| $L_{13}$ | $R_{26}$=∞ | $a_{13}$=0.0800 |  |  |
| $L_{14}$ | $R_{27}$=0.2275 | $d_{14}$=0.0600 | 1.69150 | 54.71 |
|  | $R_{28}$=−14.854 | $a_{14}$=0.0700 |  |  |
| $L_{15}$ | $R_{29}$=−0.3239 | $d_{15}$=0.0200 | 1.80518 | 25.43 |
|  | $R_{30}$=0.2195 | $a_{15}$=0.0980 |  |  |
| $L_{16}$ | $R_{31}$=−0.8460 | $d_{16}$=0.0600 | 1.62041 | 60.33 |
|  | $R_{32}$=−0.2315 | $a_{16}$=0.0020 |  |  |
| $L_{17}$ | $R_{33}$=0.2827 | $d_{17}$=0.0560 | 1.62041 | 60.33 |
|  | $R_{34}$=−3.179 | $a_{17}$=0.2884 |  |  |

The resulting focal length of the objective above may vary between 0.16·$|f_1|$ and 0.77·$|f_1|$, which gives a zoom ratio of about 5.

The aberration curves of the objective above are given by FIGS. 3 to 6. FIGS. 3 and 4 show for the shortest focus and respectively for the longest focus, the spherical aberrations which are indicated in continuous line and the deviation from the condition of the sines in discontinuous line. FIGS. 5 and 6 show also for the shortest, and the longest focal distance respectively, the tangential curvature indicated in continuous line and the sagital curvature in discontinuous line.

Figure 2:
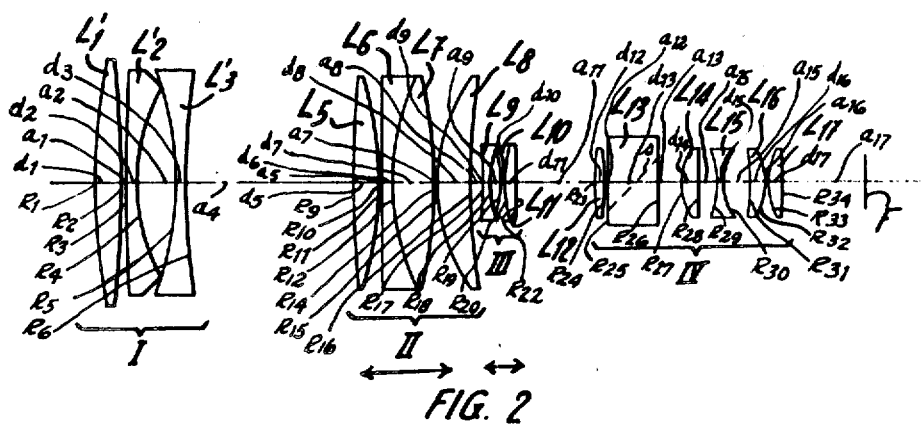
FIG. 2 is a section analogous to that of FIG. 1, showing the variation of the said embodiment.

In the variation shown in FIG. 2, the groups II, III, and IV are similar to the corresponding groups of the embodiment of FIG. 1. On the other hand, the group I only comprises three lenses $L_1'$, $L_2'$, $L_3'$ constituting a divergent system.

In a specific example, these three lenses may correspond to the following data:

| L | R | d | n | ν |
|---|---|---|---|---|
| $L'_1$ | $R'_1=2.307$ $R'_2=-4.090$ | $d'_1=0.1000$ $a'_1=0.0040$ | 1.80518 | 25.43 |
| $L'_2$ | $R'_3=8.996$ $R'_4=0.7077$ | $d'_2=0.0400$ $a'_2=0.1359$ | 1.62041 | 60.33 |
| $L'_3$ | $R'_5=-1.141$ $R'_6=2.815$ | $d'_3=0.0360$ | 1.62041 | 60.33 |

It will be apparent that various changes and modifications may be made in the embodiments described without departing from the essential concept of the invention as defined in scope by the appended claims.

We claim:

1. A variable focus objective lens comprising, in order starting from the front; a first divergent fixed-focusing group of lenses, said group including at least three lenses, the first lens of said group being convergent and the other lenses of the group being divergent, said first lens having a rear meniscus spaced from the forward meniscus of the next adjacent lens of said group; two movable groups, one convergent and the other divergent, said two movable groups filling the roll of variator and compensator at the same time; a fixed convergent rear group; said objective lens having the following numerical data:

| Lens | Curvature radius | Axial distance | Refractive index | Abbe number (ν) |
|---|---|---|---|---|
| $L_1$ | $R_1=3.510$ $R_2=-3.510$ | $d_1=0.1000$ $a_1=0.0040$ | 1.80518 | 25.43 |
| $L_2$ | $R_3=4.748$ $R_4=1.141$ | $d_2=0.0960$ $a_2=0.0360$ | 1.62041 | 60.33 |
| $L_3$ | $R_5=-2.599$ $R_6=2.009$ | $d_3=0.0360$ $a_3=0.0640$ | 1.62041 | 60.33 |
| $L_4$ | $R_7=-2.247$ $R_8=2.245$ | $d_4=0.0360$ $a_4=0.5972-0.1020$ | 1.62041 | 60.33 |
| $L_5$ | $R_9=5.002$ $R_{10}=1.281$ | $d_5=0.1040$ $a_5=0.0040$ | 1.62041 | 60.33 |
| $L_6$ | $R_{11}=14.354$ $R_{12}=0.8686$ | $d_6=0.0360$ $a_6=0.0000$ | 1.80518 | 25.43 |
| $L_7$ | $R_{13}=0.8686$ $R_{14}=-1.620$ | $d_7=0.1439$ $a_7=0.0040$ | 1.62041 | 60.33 |
| $L_8$ | $R_{15}=0.6693$ $R_{16}=2.631$ | $d_8=0.1159$ $a_8=0.0302-0.7781$ | 1.62041 | 60.33 |
| $L_9$ | $R_{17}=-2.135$ $R_{18}=0.4178$ | $d_9=0.0260$ $a_9=0.340$ | 1.62041 | 60.33 |
| $L_{10}$ | $R_{19}=-0.3654$ $R_{20}=0.5230$ | $d_{10}=0.0200$ $a_{10}=0.0000$ | 1.62041 | 60.33 |
| $L_{11}$ | $R_{21}=0.5230$ $R_{22}=-16.90$ | $d_{11}=0.0340$ $a_{11}=0.2581-0.0054$ | 1.80518 | 25.43 |
| $L_{12}$ | $R_{23}=1.000$ $R_{24}=-1.000$ | $d_{12}=0.340$ $a_{12}=0.0100$ | 1.62041 | 60.33 |
| $L_{13}$ | $R_{25}=\infty$ $R_{26}=\infty$ | $d_{13}=0.1799$ $a_{13}=0.0800$ | 1.62041 | 60.33 |
| $L_{14}$ | $R_{27}=0.2275$ $R_{28}=-14.354$ | $d_{14}=0.0600$ $a_{14}=0.0700$ | 1.69150 | 54.71 |
| $L_{15}$ | $R_{29}=-0.3239$ $R_{30}=0.2195$ | $d_{15}=0.0200$ $a_{15}=0.0980$ | 1.80518 | 25.43 |
| $L_{16}$ | $R_{31}=-0.8460$ $R_{32}=-0.2315$ | $d_{16}=0.0600$ $a_{16}=0.0020$ | 1.62041 | 60.33 |
| $L_{17}$ | $R_{33}=0.2827$ $R_{34}=-3.179$ | $d_{17}=0.0560$ $a_{17}=0.2884$ | 1.62401 | 60.33 | wherein $R_1-R_{34}$ inclusive, are the values of the radii of the refracting surfaces of the component lenses $L_1-L_{17}$, counting from the front to the rear of said objective lens; $d_1-d_{17}$ inclusive, are the values for the axial thicknesses of the lens elements and $a_1-a_{16}$ are the values for the axial distances of the air gaps between the component lenses and $a_{17}$ is the value for the axial distance of the air gap between the component lens and the focal plane; and counting from the front to the rear of said objective lens, said values for the refractive index and Abbe number being those of the respective lens material of said lenses of said objective lens.

2. An objective according to claim 1 having a zoom ratio of about 5.

3. An objective according to claim 1, wherein the focusing distance is of the order of $2f_1$ to $3f_1$.

4. A variable focus objective lens comprising, in order starting from the front; a first divergent fixed-focusing group of lenses, said group including at least three lenses, the first lens of said group being convergent and the other lenses of the group being divergent, said first lens having a rear meniscus spaced from the forward meniscus of the next adjacent lens of said group; two movable groups, one convergent and the other divergent, said two movable groups filling the role of variator and compensator at the same time; a fixed convergent rear group; said objective lens having the following numerical data:

| Lens | Curvature radius | Axial distance | Refractive index | Abbe number (ν) |
|---|---|---|---|---|
| $L'_1$ | $R'_1=2.307$ $R'_2=-4.090$ | $d'_1=0.1000$ $a'_1=0.0040$ | 1.80518 | 25.43 |
| $L'_2$ | $R'_3=8.996$ $R'_4=0.7077$ | $d'_2=0.0400$ $a'_2=0.1359$ | 1.62041 | 60.33 |
| $L'_3$ | $R'_5=-1.141$ $R'_6=2.815$ | $d'_3=0.0360$ $a_4=0.5972-0.1020$ | 1.62041 | 60.33 |
| $L_5$ | $R_9=5.002$ $R_{10}=-1.281$ | $d_5=0.1040$ $a_5=0.0040$ | 1.62041 | 60.33 |
| $L_6$ | $R_{11}=14.354$ $R_{12}=0.8686$ | $d_6=0.0360$ $a_6=0.0000$ | 1.80518 | 25.43 |
| $L_7$ | $R_{13}=0.8686$ $R_{14}=-1.620$ | $d_7=0.1439$ $a_7=0.0040$ | 1.62041 | 60.33 |
| $L_8$ | $R_{15}=0.6693$ $R_{16}=2.631$ | $d_8=0.1159$ $a_8=0.0302-0.7781$ | 1.62041 | 60.33 |
| $L_9$ | $R_{17}=-2.135$ $R_{18}=0.4178$ | $d_9=0.0260$ $a_9=0.340$ | 1.62041 | 60.33 |
| $L_{10}$ | $R_{19}=-0.3654$ $R_{20}=0.5230$ | $d_{10}=0.0200$ $a_{10}=0.0000$ | 1.62041 | 60.33 |
| $L_{11}$ | $R_{21}=0.5230$ $R_{22}=-16.90$ | $d_{11}=0.0340$ $a_{11}=0.2581-0.0054$ | 1.80518 | 25.43 |
| $L_{12}$ | $R_{23}=1.000$ $R_{24}=-1.000$ | $d_{12}=0.340$ $a_{12}=0.0100$ | 1.62041 | 60.33 |
| $L_{13}$ | $R_{25}=\infty$ $R_{26}=\infty$ | $d_{13}=0.1799$ $a_{13}=0.0800$ | 1.62041 | 60.33 |
| $L_{14}$ | $R_{27}=0.2275$ $R_{28}=-14.354$ | $d_{14}=0.0600$ $a_{14}=0.0700$ | 1.69150 | 54.71 |
| $L_{15}$ | $R_{29}=-0.3239$ $R_{30}=0.2195$ | $d_{15}=0.0200$ $a_{15}=0.0980$ | 1.80518 | 25.43 |
| $L_{16}$ | $R_{31}=-0.8460$ $R_{32}=-0.2315$ | $d_{16}=0.0600$ $a_{16}=0.0020$ | 1.62041 | 60.33 |
| $L_{17}$ | $R_{33}=0.2827$ $R_{34}=-3.179$ | $d_{17}=0.0560$ $a_{17}=0.2884$ | 1.62041 | 60.33 | wherein $R_1'-R_8'$ and $R_9-R_{34}$ inclusive, are the values of the radii of the refracting surfaces of the component lenses $L_1'-L_3'$ and $L_4-L_{17}$, counting from the front to the rear of said objective lens; $d_1'-d_3'$ and $d_3-d_{17}$, inclusive, are the values for the axial thicknesses of the lens elements and $a_1'$, $a_2'$ and $a_4-a_{16}$ are the values for the axial distances of the air gaps between the component lenses and $a_{17}$ is the value for the axial distance of the air gap between the component lens and the focal plane; and counting from the front to the rear of said objective lens, said values for the refractive index and Abbe number being those of the respective lens material of said lenses of said objective lens.

5. An objective according to claim 4, wherein the focusing distance is of the order of $2f_1$ to $3f_1$.

6. An objective according to claim 4, having a zoom ratio of about 5.